United States Patent [19]

Knothe, Erich et al.

[11] 4,085,811

[45] Apr. 25, 1978

[54] ELECTROMAGNETICALLY COMPENSATING BEAMLESS DYNAMOMETER OR WEIGHING DEVICE

[75] Inventors: Knothe, Erich, Eddigehausen; Christoph Berg; Eberhard Stadler, both of Goettingen, all of Germany

[73] Assignee: Sartorius-Werke GmbH und. vorm. Goettinger Praezisionswaagenfabrik GmbH, Goettingen, Germany

[21] Appl. No.: 711,368

[22] Filed: Aug. 3, 1976

[30] Foreign Application Priority Data

Aug. 11, 1975 Germany .............................. 2535758

[51] Int. Cl.² .......................... G01G 21/10; G01G 7/00
[52] U.S. Cl. ........................... 177/210 EM; 73/141 R; 177/DIG. 9; 308/DIG. 1
[58] Field of Search ......... 177/210 EM, 212, DIG. 9, 177/255; 73/517 B, 141 R; 308/DIG. 1

[56] References Cited

U.S. PATENT DOCUMENTS

| | | |
|---|---|---|
| 3,123,165 | 3/1964 | Carson .................................. 177/208 |
| 3,186,505 | 6/1965 | Vinzelberg ................... 177/210 EM |
| 3,225,605 | 12/1965 | Slater ............................. 73/517 B X |

Primary Examiner—Joseph W. Hartary
Attorney, Agent, or Firm—Browdy and Neimark

[57] ABSTRACT

A beamless dynamometer or weighing device comprising a coil movable in the working gap of a fixed magnet, the coil and magnet forming part of an electromagnetic compensation circuit for the dynamometer or device, and an arrangement for guiding movement of the coil within the working gap comprising an air bearing formed of a fixed guiding cylinder and an air-mounted slidable sleeve connected to the coil; preferably two coils are provided, each connected to a separate slidable sleeve, one sleeve being disposed inside the cylinder and the other sleeve outside the cylinder with the cylinder being formed of an annular jacket suppliable with compressed air which, in use, vents into the gap between the sleeves and cylinder, one sleeve being arranged to be acted upon by the force or mass to be measured and the other sleeve carrying a reference mass.

19 Claims, 4 Drawing Figures

ELECTROMAGNETICALLY COMPENSATING BEAMLESS DYNAMOMETER OR WEIGHING DEVICE

The invention relates to an electromagnetically compensating beamless dynamometer or weighing device with at least one working coil which can move in the working gap of a fixed magnet system and with a parallel guiding arrangement between one fixed and at least one movable part.

A balance is already known which has electromagnetic compensation and in which a movable, load-receiving part is deflected from a zero position under the influence of this load. The balance has a scanning device which responds to this deflection and, by way of a closed loop system, causes an electric current to flow in a compensating coil, effecting the return of the load member to the zero position in a magnetic field. The magnitude of the current which flows in this arrangement is a measure of the load to be determined. With a balance of this type it is possible to provide a reference part which has a constant mass and is held in equilibrium electromagnetically by means of its own coil in the same magnetic field as the load member. The reference part is provided with its own position scanning device which, by way of a closed loop system, determines the strength of the exciting current of a correction coil with the aid of which disturbances which falsify the result of the measurement are excluded. With this beamless balance the load member and the reference part are disposed substantially concentrically with one another, partly within a fixed, pot-type magnet system and suspended elastically on the fixed part of the balance by means of a parallelogram guiding system (CH-PS No. 521 575).

Although it is possible, with a balance of this type, to eliminate the effect of acceleration due to gravity or disturbing factors such as aging of the magnet system, the parallel guiding system of the weighing system and the reference system, consisting of spring elements, occupy a great deal of space and entail much expenditure since the spring constants of the weighing system and the reference system have to be matched exactly to one another. Moreover the arrangement is immune to tilting, for example, only if both guiding systems are adjusted exactly parallel to one another. However, this entails considerable expenditure. Furthermore, external influences, such as temperature differences for example, have adverse effects on the parallel guiding.

The state of the art also covers a device for measuring small forces. This device has a coil which is trasversed by a current and disposed in a magnetic field and which is mounted so as to slide or rotate in the direction of the force to be measured and also an electronic arrangement for the return of the coil. In this device, in order to obtain a high degree of measuring sensitivity and obviate disturbance due to overloading, the coil on the one hand and a fixed magnet pole on the other are constructed in the form of rubbing surfaces of a compressed air bearing (DT-PS No. 1 190 220).

Finally it is also known to employ air bearings in the construction of torsion balances in order to reduce friction (A. Wiemer, Luftlagerung (Air bearings), Verlag VEB-Technik, Berlin, 1969, pp. 209-211).

Balances with air bearings of this type of construction have the disadvantage that the weighing result is dependent on fluctuations in feed pressure, especially fluctuations in the zero point since the zero point of the system can alter with the fluctuations in pressure.

The problem underlying the invention consists in designing the device of the type mentioned initially in a simple and compact manner so that its manner of operation remains unaffected by environmental conditions.

This problem is solved in the device of the type described initially through the fact that the parallel guiding system comprises an air bearing which has a guiding cylinder which is kept stationary and an air-mounted sliding sleeve connected to the working coil.

This device has the advantage that it can be constructed extremely simply and compactly and, since it lacks the springs constituting the known parallel guiding systems, it is not subject to the disturbing factors associated therewith.

The guiding cylinder consists, conveniently, of an annular jacket which can be supplied with compressed air and which has substantially radial, diametrically opposed air exhaust orifices which open into a narrow annular gap between the annular jacket and the sliding sleeve from which the air can be eliminated without any reaction on the measuring system.

This non-reactive removal of air from the measuring system is due to the fact that the annular gap is open on both end faces.

The air exhaust orifices are conveniently disposed in horizontal planes which are disposed substantially symmetrically to the middle of the axial length of the guiding cylinder. In this arrangement the air exhaust orifices may be disposed in an upper and a lower horizontal plane, located at a distance from the associated end face of the annular gap amounting to one third to one eighth of the axial length of the annular gap.

To obviate any rotation the sliding sleeve has a transverse element which rests, substantially without friction, in a recess in the guiding cylinder. The recess can here be provided in a radial direction on the end face of the guiding cylinder. The recess has tangential orifices, disposed opposite one another, which are connected to the inner space of the annular jacket which is acted upon by the compressed air. As a result of the efflux of compressed air from the tangential orifices the transverse element is stabilised without friction in the recess.

The guiding cylinder may surround the sliding sleeve. However, the sliding sleeve may also surround the guiding cylinder.

In a particularly advantageous form of construction the guiding cylinder is surrounded on both sides, in each case by a sliding sleeve carrying a working coil, forming an annular gap into which the air exhaust orifices open. In this arrangement one of the sliding sleeves may carry the working coil and the second sliding sleeve the reference weight of a reference system.

With this device any fluctuations which may occur in the compressed air enter into both systems in the same way, thereby compensating one another. The air mounting does away with the differing spring constants of the weighing and reference system of the known arrangements. Moreover the parallel guiding of both systems is ensured by the high precision obtainable with turned parts. There is no need for subsequent adjustment.

Thus the device according to the invention can be used advantageously as a ratiometer.

The invention is described more fully by way of example with reference to the accompanying drawings.

Figure 1:
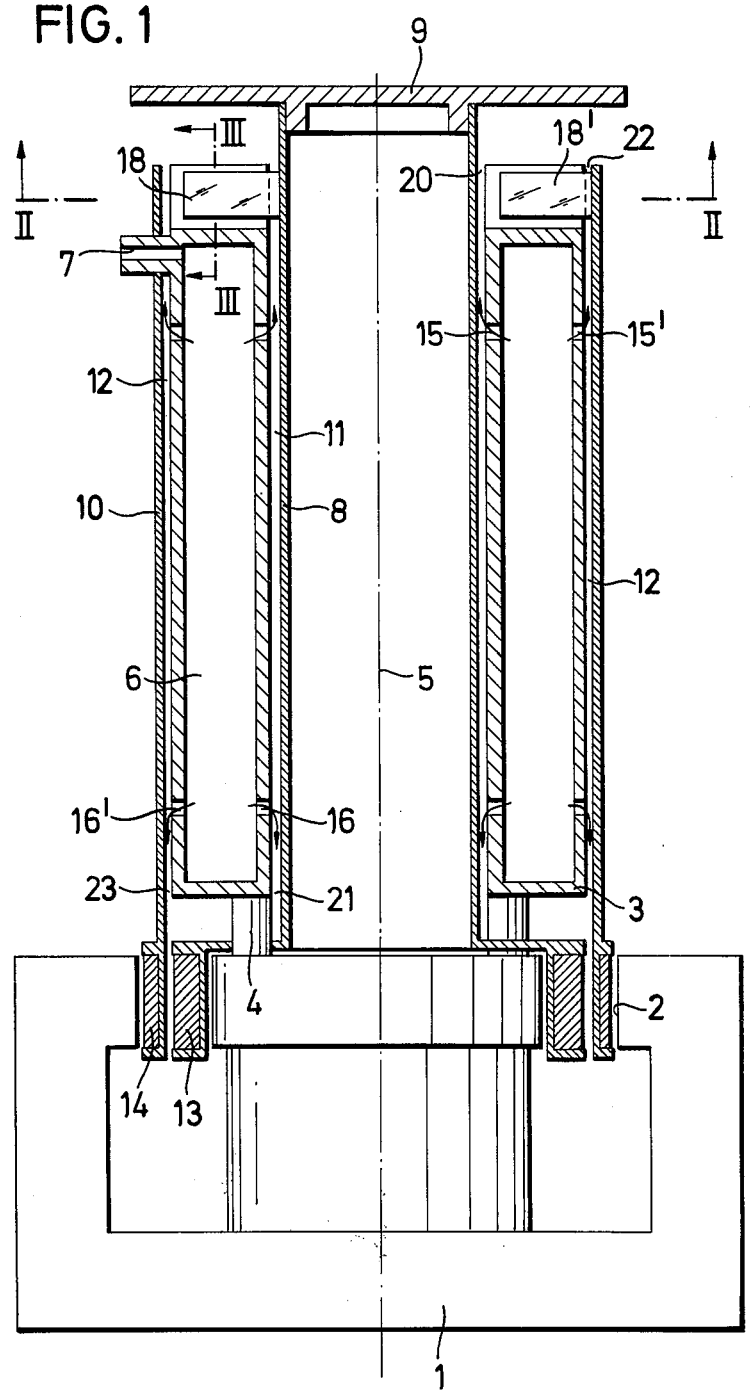
FIG. 1 shows a form of construction of the device in schematic longitudinal section.

The form of construction of an electromagnetically compensating beamless weighing device shown in the figures has a pot-shaped permanent magnet 1 with a working gap 2. Disposed on the upper side of the permanent magnet is a guiding cylinder 3 which is fastened by base elements 4 on the permanent magnet 1 at a distance to the latter. The guiding cylinder 3 is in the form of an annular jacket having an inner space 6. The guiding cylinder 3 extends at right-angles to the upper side of the permanent magnet 1. An air supply line 7, which can be connected to a source of compressed air — not shown — leads into the guiding cylinder 3.

Disposed concentrically with the axis 5 of the guiding cylinder 3 within the guiding cylinder 3 is an inner sliding sleeve 8. A further sliding sleeve 10 is disposed concentrically round the guiding cylinder 3. Between the inner sliding sleeve 8 and the guiding cylinder 3 is an annular gap 11 and between the outer sliding sleeve 10 and the guiding cylinder 3 is an outer annular gap 12. The width of the annular gaps 11 and 12 is of dimensions suitable for air bearing. The annular gaps are of a width between 1/10 and 1/100 mm. On the magnet side the inner sliding sleeve 8 has a working coil 13 and the outer sliding sleeve 10 has a working coil 14. Both the working coils 13 and 14 are disposed in the working gap 2 of the permanent magnet 1. The working coils 13 and 14 are connected to the output of a variable-gain amplifier by means of non-reactive connections.

On its inner side the guiding cylinder 3 has upper air exhaust orifices 15 and lower air exhaust orifices 16 disposed diametrically opposite one another in a horizontal plane and aligned radially relative to the inner annular gap 11. In the same horizontal planes the guiding cylinder 3 has on its outer side upper air exhaust orifices 15' and lower air exhaust orifices 16' disposed diametrically opposite one another and radially aligned relative to the outer annular gap 12. The upper air exhaust orifices 15 and 15' and the lower air exhaust orifices 16 and 16' are symmetrical relative to the middle of the axial longitudinal extension of the guiding cylinder 3 and are disposed at a distance from the end faces of the guiding cylinder 3 corresponding roughly to one seventh of the length of the guiding cylinder 3.

Figure 2:
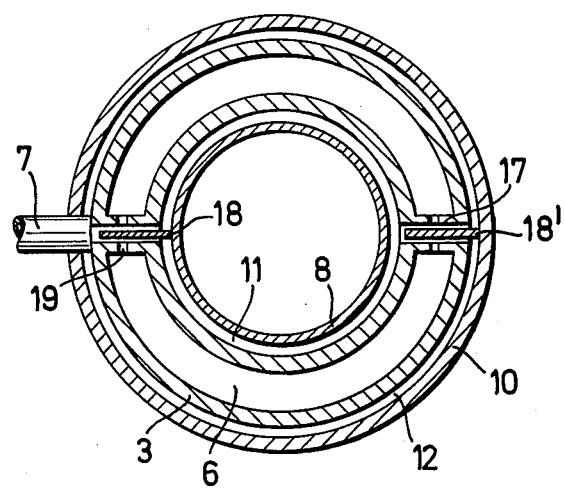
FIG. 2 is a section taken along the line II—II of FIG. 1.
Figure 3:
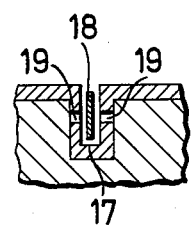
FIG. 3 is a section taken along the line III—III of FIG. 1.

On its upper end face the guiding cylinder 3 has two diametrically opposed recesses 17, as can be seen in detail in FIGS. 2 and 3. The walls of the recess 17 are penetrated by tangential air exhaust orifices 19 disposed opposite one another which open out into the inner space 6 of the guiding cylinder 3. The inner sliding sleeve 8 carries a transverse element 18 and the outer sliding sleeve 10 a transverse element 18'. The transverse elements 18 and 18' are disposed in the recesses 17 so as to project with play.

The inner annular gap 11 has an upper air eliminator 20 and a lower air eliminator 21, both at the end face, while the outer annular gap 12 has an upper air eliminator 22 and a lower air eliminator 23, likewise both at the end face. The lower ring-shaped air eliminators at the end face 21 and 23 are disposed at a distance from the permanent magnet 1 by means of the base elements 4. The upper air eliminators 20 and 22, which are also ring-shaped, are disposed at a distance from the balance pan 9. The distances are such as to preclude any reaction on the measuring system by the outflowing air.

The sliding sleeve 8 with the balance pan 9 and the working coil 13 form a first weighing system and the sliding sleeve 10 with the working coil 14 a second weighing system, which may also constitute the reference system, or conversely.

The device according to the invention operates as follows.

When compressed air is fed through the air supply line 7 to the inner space 6 of the guiding cylinder 3, it flows out of the upper and lower, inner and outer air exhaust orifices 15, 15', 16 and 16' into the annular gaps 11 and 12 so that the inner sliding sleeve 8 and the outer sliding sleeve 10 are air-mounted relative to the inner wall and the outer wall of the guiding cylinder 3, respectively. At the same time air flows through the tangential orifices 19 into the recesses 17 so that the transverse element 18' of the outer sliding sleeve 10 and the transverse element 18 of the inner sliding sleeve 8 are stabilised without friction in the associated recess 17. The parallel guiding of the two sliding sleeves achieved by the air bearings continues unchanged even if the device is tilted. When a load is put on to the balance pan 9 the position indicators — not shown — generate corresponding position signals. The information resulting from these signals is fed back by way of a variable-gain amplifier to the respective working coils for compensation, whereby the weight of the load put on to the balance pan 9 is determined in a ratiometer and displayed digitally.

Figure 4:
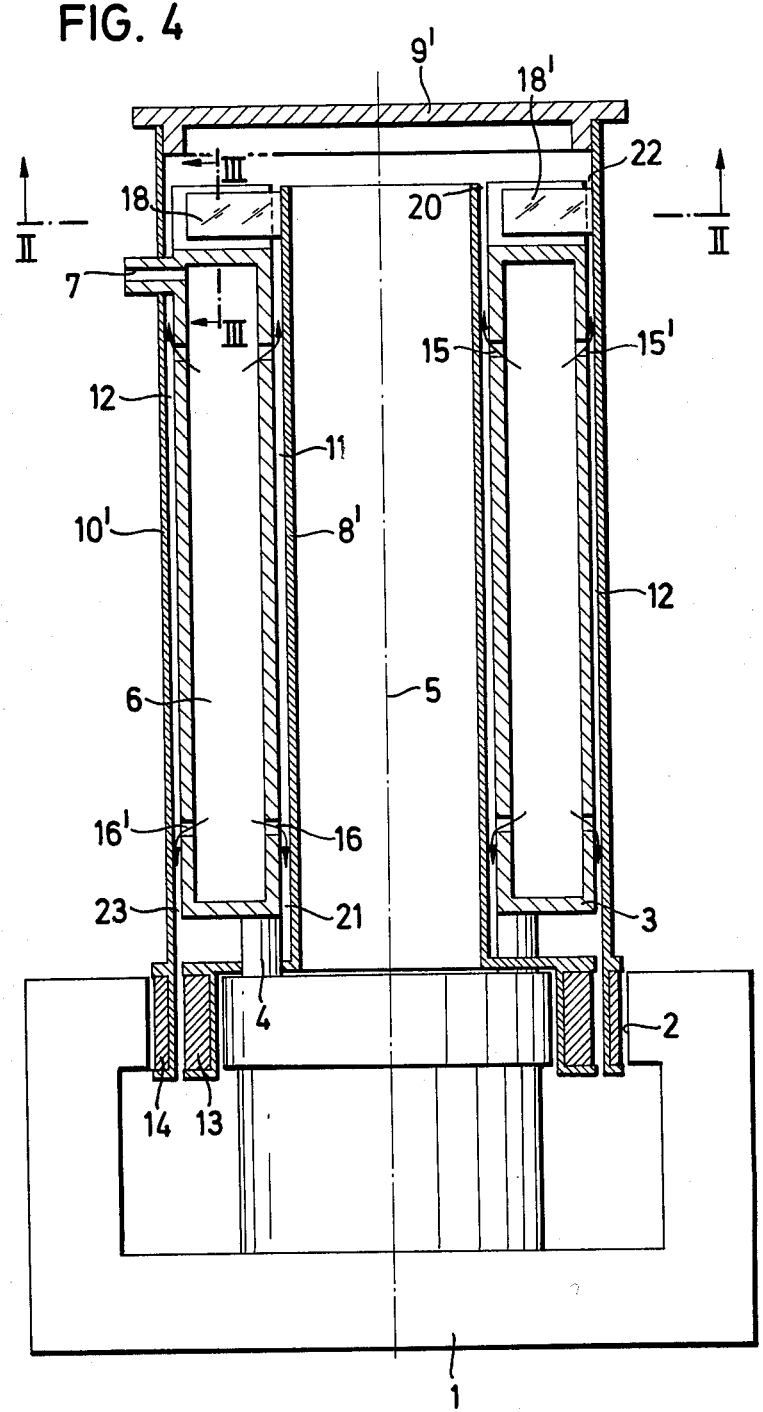
FIG. 4 illustrates a second embodiment of a device constructed according to the present invention in schematic longitudinal section.

FIG. 4 illustrates an electromagnetically-compensating beamless dynamometer (weighing device) which in similar to that shown in FIG. 1 and wherein like reference numerals designate like parts, modified parts being designated by numerals having added prime signs. As shown in FIG. 4, the pan 9 (FIG. 1) is replaced by a pan 9' which is carried on sliding sleeve 10', which replaces sliding sleeve 10 (FIG. 1), while the inner, sliding sleeve 8 (FIG. 1) is replaced by sleeve 8' which does not contact or support the pan 9. As shown in FIG. 4, the sliding sleeve 10' carries the transverse element 18' and the sleeve 8' carries the transverse element 18.

We claim:

1. An electromagnetically-compensating beamless dynamometer or weighing device which comprises a fixed magnet, a working gap provided by said magnet, a coil movable within said working gap, and an arrangement for guiding movement of said movable coil relative to said fixed magnet, said guiding arrangement comprising a fixed guiding cylinder and an air-mounted slidable sleeve connected to said coil, said cylinder and sleeve forming an air bearing, and wherein the slidable sleeve has a transverse element which rests, substantially without friction in a recess in the guiding cylinder.

2. A dynamometer or weighing device according to claim 1, wherein the guiding cylinder is formed as an annular jacket arranged to be supplied with compressed air and which has substantially radial, diametrically opposite air exhaust orifices opening into a narrow annular gap between the guiding cylinder and the slidable sleeve and out of which gap air can be removed without any reaction on the measuring system.

3. A dynamometer or weighing device according to claim 2, wherein the annular gap is open at both ends.

4. A dynamometer or weighing device according to claim 2, wherein the air exhaust orifices are disposed in horizontal planes which are substantially symmetrical relative to the middle of the axial length of the guiding cylinder.

5. A dynamometer or weighing device according to claim 4, wherein the air exhaust orifices are disposed in an upper and a lower horizontal plane at a distance from the associated end face of the annular gap amounting to from a third to an eighth of the axial length of the annular gap.

6. A dynamometer or weighing device according to claim 1, wherein the recess is disposed adjacent an end face of the guiding cylinder extends in a radial direction, and is provided with tangential orifices disposed opposite one another which communicate with the inner space of the annular jacket which is suppliable with compressed air.

7. A dynamometer or weighing device according to claim 1, wherein the guiding cylinder surrounds the slidable sleeve.

8. A dynamometer or weighing device according to claim 1, wherein the slidable sleeve surrounds the guiding cylinder.

9. An electromagnetically-compensating beamless dynamometer or weighing device which comprises a fixed magnet, a working gap provided by said magnet, a coil movable within said working gap, and an arrangement for guiding movement of said movable coil relative to said fixed magnet, said guiding arrangement comprising a fixed guiding cylinder and an air-mounted slidable sleeve connected to said coil, said cylinder and sleeve forming an air bearing, and wherein the guiding cylinder is surrounded on both sides by a slidable sleeve, each said sleeve carrying a working coil movable in the working gap of the magnet, so to form an inner and outer annular gap each forming an air bearing.

10. A dynamometer or weighing device according to claim 9, wherein the inner slidable sleeve is arranged to be acted upon by the force, or mass to be measured and the outer slidable sleeve carries a reference mass.

11. A dynamometer or weighing device according to claim 9, wherein the outer slidable sleeve is arranged to be acted upon by the force, or mass to be measured and the inner slidable sleeve carries a reference mass.

12. A dynamometer or weighing device according to claim 9, wherein the guiding cylinder is formed as an annular jacket arranged to be supplied with compressed air and which has substantially radial, diametrically opposite air exhaust orifices opening into a narrow annular gap between the guiding cylinder and the slidable sleeve and out of which gap air can be removed without any reaction on the measuring system.

13. A dynamometer or weighing device according to claim 12, wherein the annular gap is open at both ends.

14. A dynamometer or weighing device according to claim 12, wherein the air exhaust orifices are disposed in horizontal planes which are substantially symmetrical relative to the middle of the axial length of the guiding cylinder.

15. A dynamometer or weighing device according to claim 14, wherein the air exhaust orifices are disposed in an upper and a lower horizontal plane at a distance from the associated end face of the annular gap amounting to from a third to an eighth of the axial length of the annular gap.

16. A dynamometer or weighing device according to claim 9, wherein the slidable sleeve has a transverse element which rests, substantially without friction in a recess in the guiding cylinder.

17. A dynamometer or weighing device according to claim 16, wherein the recess is disposed adjacent an end face of the guiding cylinder extends in a radial direction, and is provided with tangential orifices disposed opposite one another which communicate with the inner space of the annular jacket which is suppliable with compressed air.

18. A dynamometer or weighing device according to claim 10, wherein the guiding cylinder surrounds the slidable sleeve.

19. A dynamometer or weighing device according to claim 9, wherein the slidable sleeve surrounds the guiding cylinder.

* * * * *